(12) United States Patent
Tsai et al.

(10) Patent No.: US 12,292,919 B2
(45) Date of Patent: May 6, 2025

(54) DATA CLASSIFICATION METHOD FOR CLASSIFYING INLIER AND OUTLIER DATA

(71) Applicant: HTC Corporation, Taoyuan (TW)

(72) Inventors: Chen-Han Tsai, Taoyuan (TW); Yu-Shao Peng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/503,197

(22) Filed: Nov. 7, 2023

(65) Prior Publication Data

US 2024/0160660 A1 May 16, 2024

Related U.S. Application Data

(60) Provisional application No. 63/488,976, filed on Mar. 8, 2023, provisional application No. 63/382,723, filed on Nov. 8, 2022.

(51) Int. Cl.
*G06F 16/55* (2019.01)
*G06F 18/241* (2023.01)

(52) U.S. Cl.
CPC ............ *G06F 16/55* (2019.01); *G06F 18/241* (2023.01)

(58) Field of Classification Search
CPC ........ G06F 16/55; G06F 16/50; G06F 18/241; G06V 10/764; G06V 10/774; G06V 10/809
See application file for complete search history.

(56) References Cited

U.S. PATENT DOCUMENTS

| 10,614,379 B2 | 4/2020 | Fu et al. | |
| 2021/0042330 A1* | 2/2021 | Bremer | G06N 20/20 |
| 2024/0242131 A1* | 7/2024 | Ravindran | G06F 16/906 |

FOREIGN PATENT DOCUMENTS

| CN | 105612554 B | 5/2019 | |
| CN | 111046933 A | * 4/2020 | ........... G06F 18/241 |
| CN | 111310846 A | 6/2020 | |
| CN | 113627458 A | 11/2021 | |
| CN | 114154570 A | 3/2022 | |
| CN | 114429170 A | 5/2022 | |
| CN | 114650167 A | 6/2022 | |
| JP | 2000-285141 A | 10/2000 | |
| JP | 2020-003846 A | 1/2020 | |
| JP | 2020-32044 A | 3/2020 | |
| JP | 2021-508373 A | 3/2021 | |
| TW | 202109030 A | 3/2021 | |
| WO | 2019/102043 A1 | 5/2019 | |

OTHER PUBLICATIONS

The office action of the corresponding Taiwanese application No. TW112142925 issued on Apr. 22, 2024.
The office action of the corresponding Japanese application No. JP2023-190037 issued on Nov. 19, 2024.

* cited by examiner

*Primary Examiner* — Michael Pham
(74) *Attorney, Agent, or Firm* — CKC & Partners Co., LLC

(57) ABSTRACT

A data classification method, for classifying unlabeled images into an inlier data set or an outlier data set, include following steps. The unlabeled images are obtained. An assigned inlier image is selected among the unlabeled images. A similarity matrix is computed and the similarity matrix includes first similarity scores of the unlabeled images relative to the assigned inlier image. Each of the unlabeled images is classified into an inlier data set or an outlier data set according to the similarity matrix, so as to generate inlier-outlier predictions of the unlabeled images.

20 Claims, 11 Drawing Sheets

| | PRED$_{R1}$ | PRED$_{R2}$ | ... | PRED$_{RQ}$ |
|---|---|---|---|---|
| IMG1 | inlier | inlier | --- | inlier |
| IMG2 | outlier | inlier | --- | inlier |
| IMG3 | inlier | inlier | --- | inlier |
| IMG4 | inlier | outlier | --- | inlier |
| IMG5 | outlier | inlier | --- | outlier |
| IMG6 | outlier | outlier | --- | outlier |

PRED$_{ALL}$

INLa

FIG. 8

DATA CLASSIFICATION METHOD FOR CLASSIFYING INLIER AND OUTLIER DATA

RELATED APPLICATIONS

This application claims the priority benefit of U.S. Provisional Application Ser. No. 63/382,723, filed Nov. 8, 2022, which is herein incorporated by reference.

BACKGROUND

Field of Invention

The disclosure relates to a classification method. More particularly, the disclosure relates to a classification method for classifying unlabeled data into an inlier data set or an outlier data set.

Description of Related Art

Outlier detection in machine learning technology is the process of identifying data instances that deviate significantly from the normal distribution within a dataset. Detecting outliers is crucial in various applications, including medical prediction, fraud detection, network security, quality control, and anomaly detection in healthcare or industrial processes.

SUMMARY

An embodiment of the disclosure provides a data classification method, which includes following steps. Unlabeled image are obtained. Q prediction rounds are executed on the unlabeled images. Q is a positive integer. Each of the Q prediction rounds includes: randomly selecting assumed inlier images among the unlabeled images; computing a first similarity matrix comprising first similarity scores of the unlabeled images relative to the assumed inlier images; and generating intermediate inlier-outlier predictions about the unlabeled images in one prediction round according to the first similarity matrix. The intermediate inlier-outlier predictions about the unlabeled images generated respectively in the Q prediction rounds are aggregated to select aggregate-predicted inlier images among the unlabeled images. A second similarity matrix is computed, and the second similarity matrix includes second similarity scores of the unlabeled images relative to the aggregate-predicted inlier images. Each of the unlabeled images is classified into an inlier data set or an outlier data set according to the second similarity matrix, so as to generate inlier-outlier predictions of the unlabeled images.

Another embodiment of the disclosure provides a data classification method, which includes following steps. Unlabeled images are obtained. An assigned inlier image is selected among the unlabeled images. A similarity matrix is computed and the similarity matrix includes first similarity scores of the unlabeled images relative to the assigned inlier image. Each of the unlabeled images is classified into an inlier data set or an outlier data set according to the similarity matrix, so as to generate inlier-outlier predictions of the unlabeled images.

Another embodiment of the disclosure provides a data classification method, which includes the following steps. Unlabeled images are obtained. Q prediction rounds are executed about the unlabeled images. Q is a positive integer. Each of the Q prediction rounds includes: randomly selecting assumed inlier images among the unlabeled images; computing a first similarity matrix comprising first similarity scores of the unlabeled images relative to the assumed inlier images; and generating intermediate inlier-outlier predictions about the unlabeled images in one prediction round according to the first similarity matrix. The intermediate inlier-outlier predictions about the unlabeled images generated respectively in the Q prediction rounds are aggregated to select aggregate-predicted inlier images among the unlabeled images. A second similarity matrix is computed, and the second similarity matrix includes second similarity scores of the unlabeled images relative to the aggregate-predicted inlier images. Each of the unlabeled images are classified into an inlier data set or an outlier data set according to the second similarity matrix, so as to generate first inlier-outlier predictions of the unlabeled images. A part of the first inlier-outlier predictions of the unlabeled images is displayed. An adjustment input revised from the first inlier-outlier predictions is obtained. A third similarity matrix is computed, and the third similarity matrix includes third similarity scores of the unlabeled images relative to the adjustment input. Each of the unlabeled images are classified into the inlier data set or the outlier data set according to the third similarity matrix, so as to generate second inlier-outlier predictions of the unlabeled images.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 8 is a schematic diagram illustrating aggregated predictions of all prediction rounds according to some embodiments of the disclosure.

DETAILED DESCRIPTION

Figure 1:
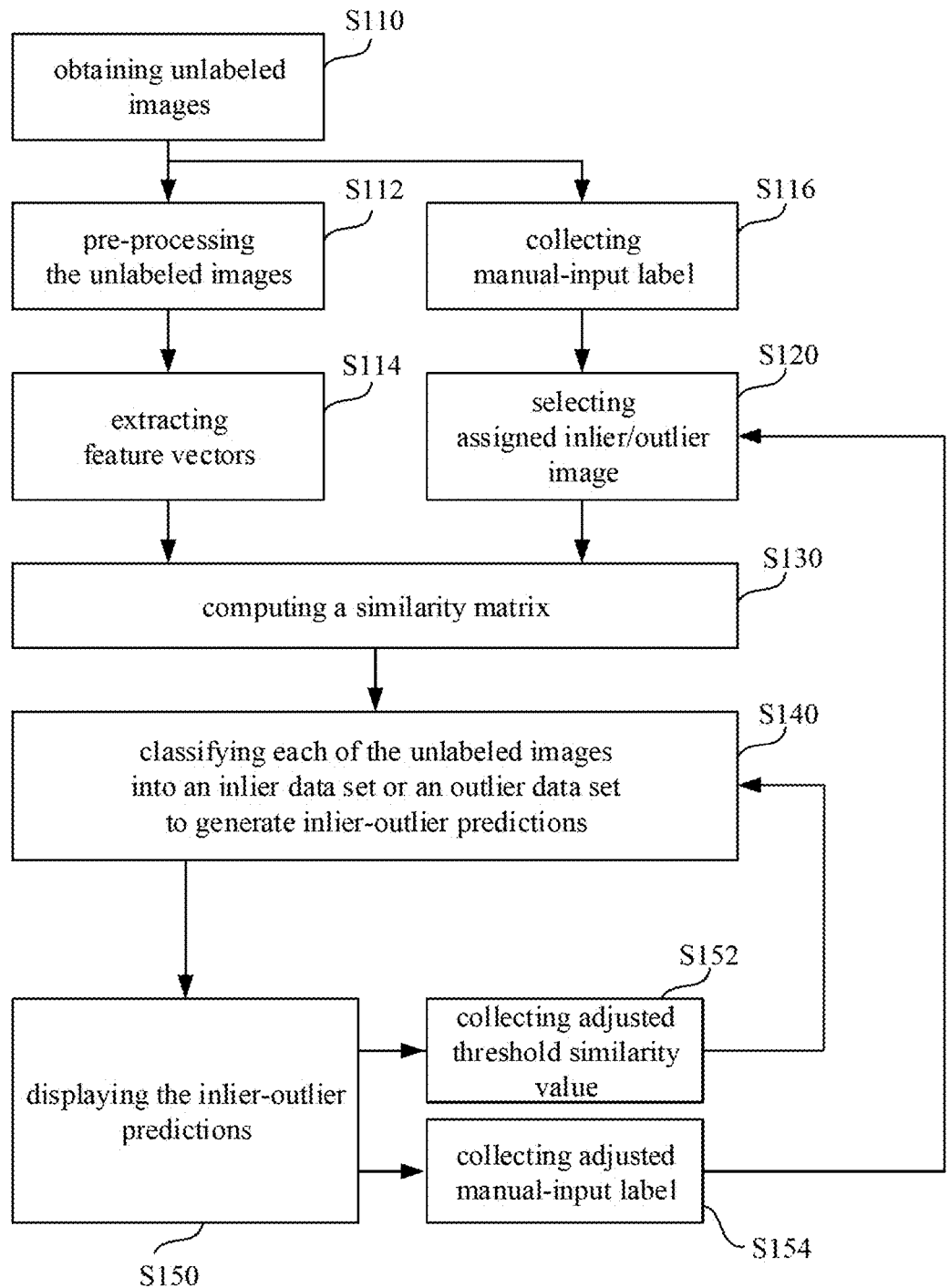
FIG. 1 is a flow chart diagram illustrating a data classification method according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a flow chart diagram illustrating a data classification method 100 according to some embodiments of the disclosure. The data classification method 100 is configured to classify unlabeled images into an inlier data set or an outlier data set, so as to generate inlier-outlier predictions of the unlabeled images in a dataset.

It is desirable to train a machine learning model according to a training dataset without the outliers. If the training dataset includes outliers, it can have several effects on the performance and behavior of machine learning models. For example, the outliers in the training dataset may cause issues like model bias, increased model complexity, overfitting, reduced robustness, and difficulty in anomaly detection.

In a healthcare application, unlabeled images can include different kinds of medical examination images, such as chest X-ray images, brain MRI images and abdominal ultrasound images. These different medical examination images have different usages in different diagnosis.

For example, the chest X-ray images are beneficial in training a machine learning model for detecting pneumonia, and the brain MRI images and the abdominal ultrasound images are not suitable for detecting the pneumonia. Including the brain MRI images and the abdominal ultrasound images in the training dataset can be harmful in training the pneumonia detection model. In this case, the chest X-ray images should be regarded as inliers, and the brain MRI images and the abdominal ultrasound images should be regarded as outliers.

Manually labeling inliers and outliers within datasets can be a time-consuming and costly process, especially when dealing with large datasets. It requires human experts to review and identify inliers and outliers, which can be impractical for big datasets.

Figure 2:
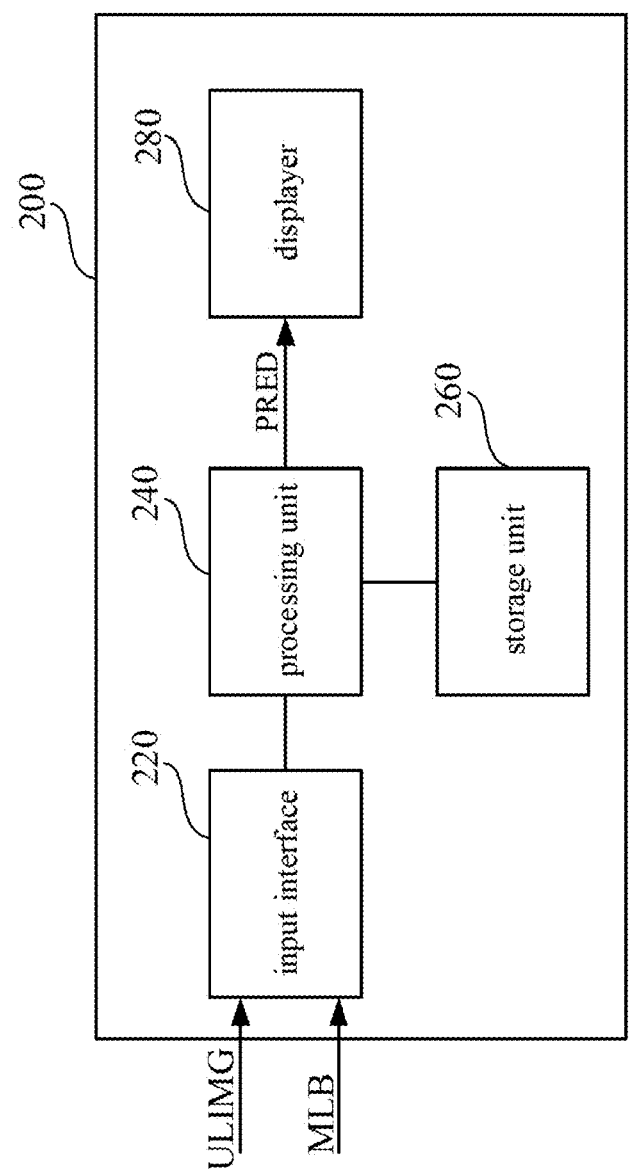
FIG. 2 is a block diagram illustrating an electronic device for performing the data classification method shown in FIG. 1 in some embodiments of the disclosure.

In some embodiments, the data classification method 100 provides an easier way to generate inlier-outlier predictions of the unlabeled images in a dataset. Reference is further made to FIG. 2. FIG. 2 is a block diagram illustrating an electronic device 200 for performing the data classification method 100 shown in FIG. 1 in some embodiments of the disclosure. As shown in FIG. 2, the electronic device 200 includes an input interface 220, a processing unit 240, a storage unit 260 and a displayer 280. In some embodiments, the electronic device 200 can be a computer, a smartphone, a tablet, an image processing server, a data server or any equivalent image processing device.

The input interface 220 is configured to receive unlabeled images ULIMG and other manually instructions. In some embodiments, the electronic device 200 can classify the unlabeled images ULIMG, and then display the classification result (i.e., inlier-outlier predictions PRED of the unlabeled images ULIMG) on the displayer 280. The input interface 220 can include a data transmission interface, a wireless communication circuit, a keyboard, a mouse, a microphone or any equivalent input device. The processing unit 240 is coupled with the input interface 220, the storage unit 260 and the displayer 280. The storage unit 260 is configured to store a program code. The program code stored in the storage unit 260 is configured for instructing the processing unit 240 to execute the data classification method 100 shown in FIG. 1. In some embodiments, the processing unit 240 can be a processor, a graphic processor, an application specific integrated circuit (ASIC) or any equivalent processing circuit.

Figure 3:
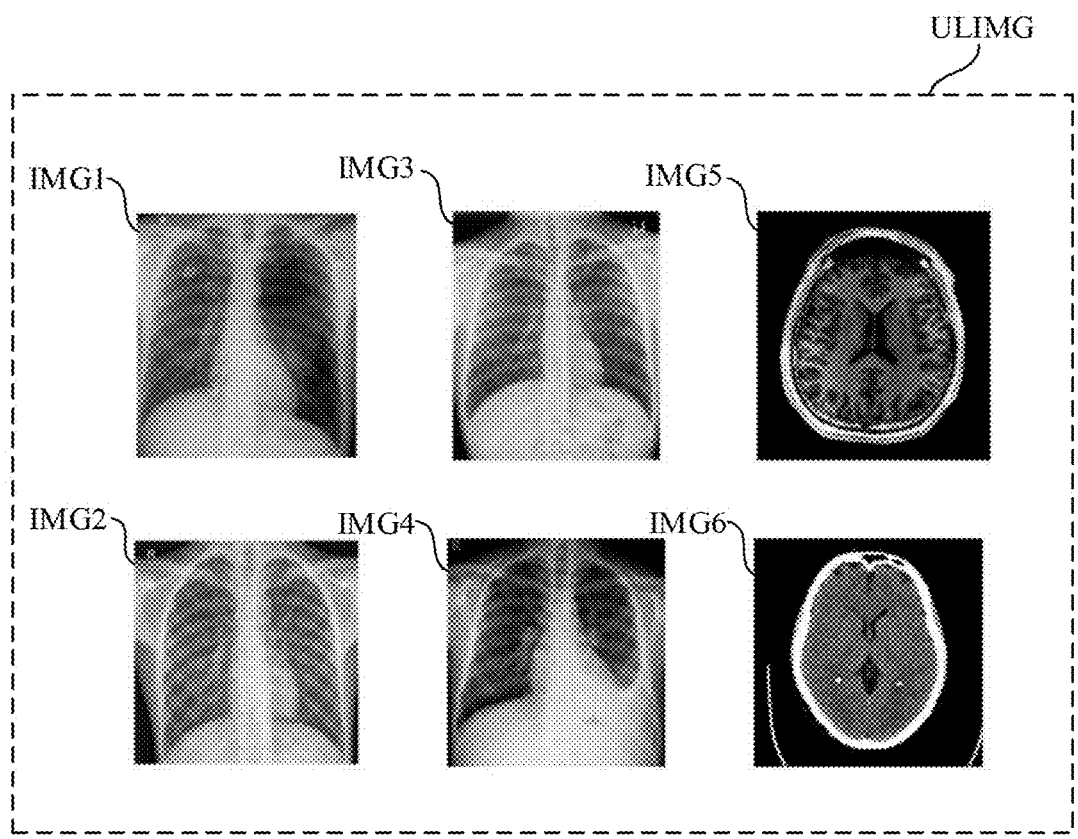
FIG. 3 is a schematic diagram illustrating a demonstrational example about the unlabeled images.

Reference is further made to FIG. 3, which is a schematic diagram illustrating a demonstrational example about the unlabeled images ULIMG.

In some embodiments, as shown in FIG. 1 and FIG. 2, step S110 is executed, by the processing unit 240, to obtain the unlabeled images ULIMG through the input interface 220 from an external source (e.g., medial image servers in hospitals). In some other embodiments, the unlabeled images ULIMG can be stored in the storage unit 260, and the processing unit 240 can obtain the unlabeled images ULIMG from the storage unit 260. As shown in FIG. 3, the unlabeled images ULIMG include six images IMG1-IMG6, which are a mixture of four chest X-ray images IMG1-IMG4 and two brain MRI images IMG5-IMG6 in this demonstrational example.

It is noticed that there are six images IMG1-IMG6 of the unlabeled images ULIMG shown in FIG. 3 for demonstrational purpose in brevity. However, the disclosure is not limited thereto. In practices, the unlabeled images ULIMG may include hundreds, thousands or even more images.

As shown in FIG. 1, FIG. 2 and FIG. 3, step S112 is executed, by the processing unit 240, to pre-processing the unlabeled images ULIMG. The images IMG1-IMG6 within the unlabeled images ULIMG can be captured by different examination machines and stored in different file formats. During the pre-processing in step S112, the processing unit 240 is configured to perform pixel-value windowing, intensity scaling, size scaling and/or normalization to the unlabeled images ULIMG, so as to convert the unlabeled images ULIMG into the same format, the same size scale and/or the same color scale.

As shown in FIG. 1, FIG. 2 and FIG. 3, after pre-processing, step S114 is executed, by the processing unit 240, to extract corresponding feature vectors from the pre-processed unlabeled images ULIMG. In some embodiments, the processing unit 240 can operate a neural network model (e.g., Contrastive Language-Image Pre-Training (CLIP) neural network or a Residual Network (ResNet)) to extract the feature vectors. One feature vector will be extracted from each of the images IMG1-IMG6 in the unlabeled images ULIMG.

Figure 4:
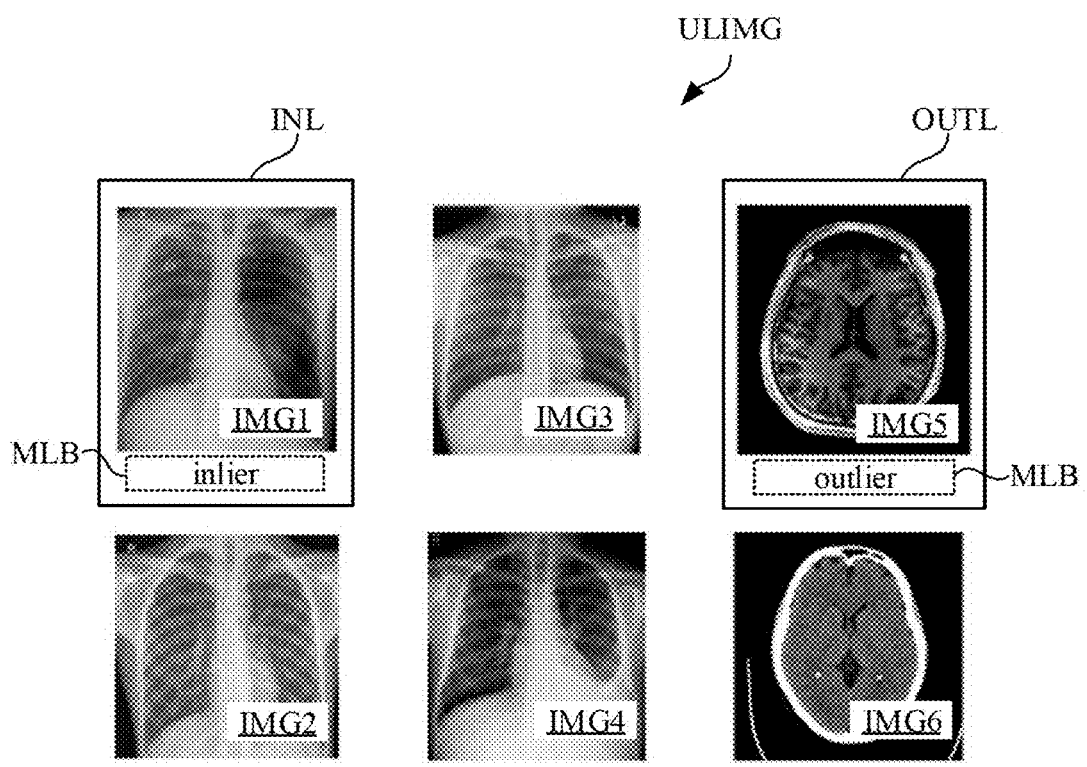
FIG. 4 is a schematic diagram illustrating the manual-input labels on a part of the images in some embodiments.

On the other hand, step S116 is executed to collect some manual-input labels MLB by the input interface 220. In some embodiments, a user can manually assign the manual-input labels MLB corresponding to the images IMG1-IMG6 of the unlabeled images ULIMG. Reference is further made to FIG. 4, which is a schematic diagram illustrating the manual-input labels MLB on a part of the images IMG1-IMG6 in some embodiments. In the demonstrational example shown in FIG. 4, it is assumed that the user inputs the manual-input labels MLB to assign one image IMG1 as "inlier" and another image IMG5 as "outlier". In response to the manual-input labels MLB collected from the user, step S120 is executed, by the processing unit 240, to select the image IMG1 among the unlabeled images ULIMG as an assigned inlier image INL based on the manual-input labels MLB, and also select the image IMG5 among the unlabeled images ULIMG as an assigned outlier image OUTL based on the manual-input labels MLB.

It is noticed that, in this case, the user provides the manual-input labels MLB on a part (i.e., two images IMG1 and IMG5) of the unlabeled images ULIMG. Other four images IMG2, IMG3, IMG4 and IMG6 remains unlabeled.

The data classification method 100 shown in FIG. 1 is configured to generate inlier-outlier predictions of the unlabeled images IMG2, IMG3, IMG4 and IMG6 based on a small amount of manual-labeled images (i.e., the assigned inlier image INL and the assigned outlier image OUTL). The disclosure is not limited to this amount of the unlabeled images and manual-input labels. In practical applications, for example, the unlabeled images ULIMG may include 5000 images, and the user can manually label on 5 images, and the data classification method 100 is configured to generate inlier-outlier predictions PRED of the other 4995 images.

In aforesaid embodiments, the manual-input labels MLB includes one inlier label and one outlier label to select one assigned inlier image INL and one assigned outlier image OUTL. However, the disclosure is not limited thereto.

In other embodiments, the manual-input labels MLB include 1, 2, 3 or more inlier label to select at least one assigned inlier image INL. The manual-input labels MLB include 0, 1, 2, 3 or more outlier label. In other words, the assigned outlier image OUTL is not necessarily required in generating the inlier-outlier predictions PRED.

Figure 5A:
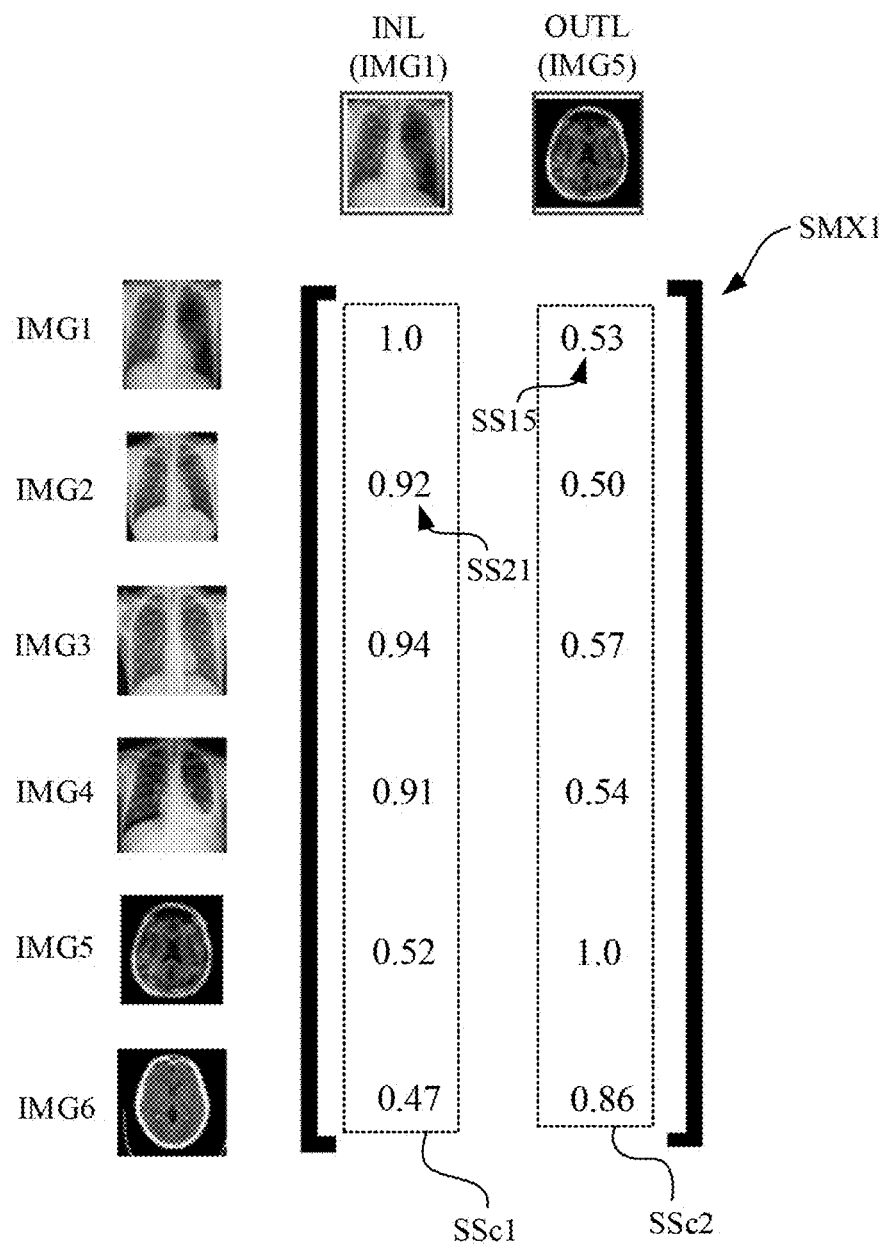
FIG. 5A is a schematic diagram illustrating the similarity matrix according to the demonstrational example.

As shown in FIG. 1, FIG. 2 and FIG. 4, step S130 is executed, by the processing unit 240, to compute a similarity matrix between the unlabeled images ULIMG and manual-labeled images (e.g., the assigned inlier image INL and the assigned outlier image OUTL). Reference is further made to FIG. 5A, which is a schematic diagram illustrating the similarity matrix SMX1 according to the demonstrational example.

As shown in FIG. 5A, the similarity matrix SMX1 includes first similarity scores SSc1 of the unlabeled images (e.g., IMG1-IMG6) relative to the assigned inlier image INL, as shown in the first column of the similarity matrix SMX1. In addition, as shown in FIG. 5A, the similarity matrix SMX1 further includes second similarity scores SSc2 of the unlabeled images (e.g., IMG1-IMG6) relative to the assigned outlier image OUTL.

In some embodiments, the processing unit 240 is configured to perform a similarity algorithm between feature vectors extracted from the unlabeled images (e.g., IMG1-IMG6) and the assigned inlier image INL, so as to compute the first similarity scores SSc1. The similarity algorithm can be selected from a cosine similarity algorithm, a Euclidean distance similarity algorithm, a Manhattan distance algorithm or a Hamming distance algorithm.

The processing unit 240 can perform a cosine similarity algorithm to calculate first similarity scores SSc1 in an cosine similarity equation as:

$$\cos(A, B) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad \text{equation (1)}$$

In aforesaid equation (1), A and B are feature vectors of two images to be compared.

For example, the processing unit 240 can perform the cosine similarity algorithm to calculate one similarity score SS21 between the image IMG2 and the assigned inlier image INL (i.e., the image IMG1) in the cosine similarity equation as:

$$\cos(V2, V1) = \frac{V2 \cdot V1}{\|V2\|\|V1\|} = \frac{\sum_{i=1}^{n} V2_i V1_i}{\sqrt{\sum_{i=1}^{n} V2_i^2} \sqrt{\sum_{i=1}^{n} V1_i^2}} \quad \text{equation (2)}$$

In aforesaid equation (2), V1 is the feature vector of the image IMG1, and V2 is the feature vector of the image IMG2. In the same way, other similarity scores in the first similarity scores SSc1 can be calculated based on the similarity algorithm.

If the feature vectors of two images IMG2 and IMG1 are similar to each other, the similarity score SS21 will be closer to 1. In this case, because the images IMG2 and IMG1 are similar to each other, the similarity score SS21 is 0.92, which is adjacent to 1. On the other hand, if the feature vectors of two images are different from each other, the similarity score will be closer to 0.

Similarly, the processing unit 240 can perform the cosine similarity algorithm to calculate second similarity score SSc2 between the images IMG1-IMG6 and the assigned outlier image OUTL (i.e., the image IMG5).

For example, the processing unit 240 can perform the cosine similarity algorithm to calculate one similarity score SS15 between the image IMG1 and the assigned outlier image OUTL (i.e., the image IMG5) in the cosine similarity equation as:

$$\cos(V1, V5) = \frac{V1 \cdot V5}{\|V1\|\|V5\|} = \frac{\sum_{i=1}^{n} V1_i V5_i}{\sqrt{\sum_{i=1}^{n} V1_i^2} \sqrt{\sum_{i=1}^{n} V5_i^2}} \quad \text{equation (3)}$$

In aforesaid equation (3), V1 is the feature vector of the image IMG1, and V5 is the feature vector of the image IMG5. In this case, because the images IMG1 and IMG5 are different from each other, the similarity score SS15 is 0.53, which is not adjacent to 1.

Figure 5B:
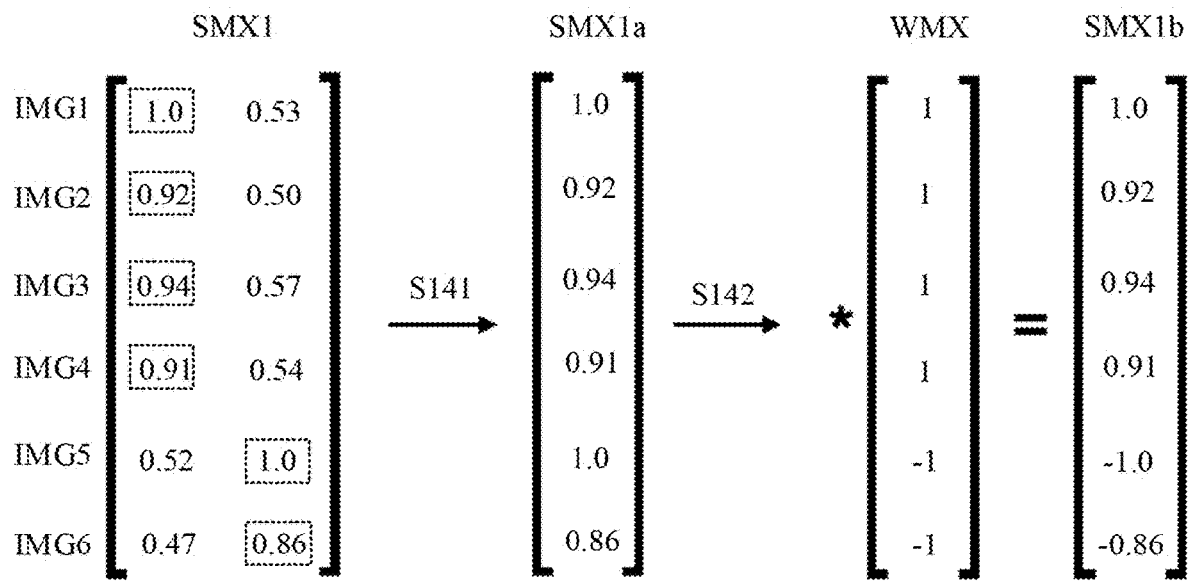
FIG. 5B and FIG. 5C are schematic diagrams illustrating how the similarity matrix is processed to generate the inlier-outlier predictions according to the demonstrational example.
Figure 5C:
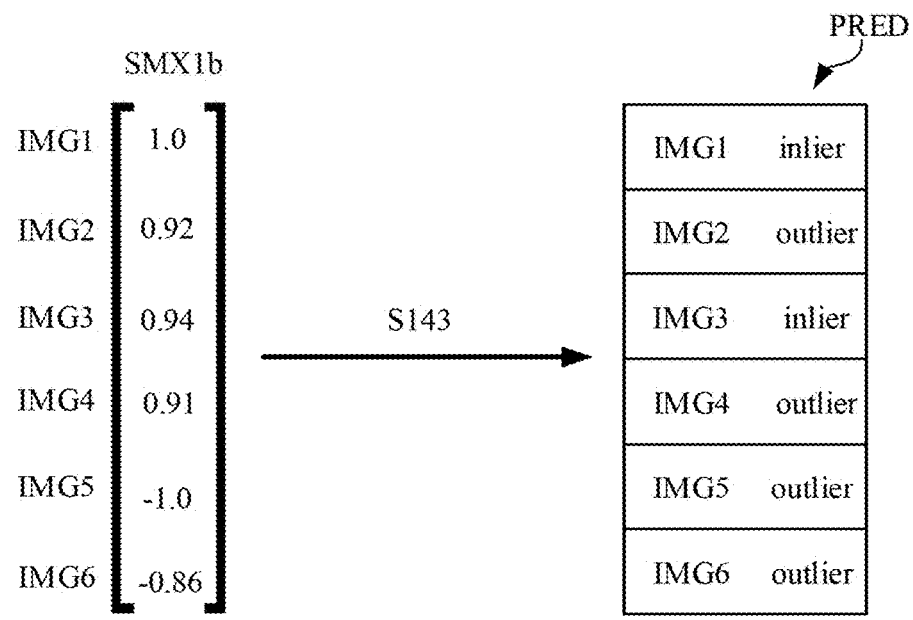

As shown in FIG. 1, FIG. 2 and FIG. 5A, step S140 is executed, by the processing unit 240, to classify each of the unlabeled images ULIMG into an inlier data set or an outlier data set according to the similarity matrix SMX1, so as to generate inlier-outlier predictions PRED of the unlabeled images ULIMG. Reference is further made to FIG. 5B and FIG. 5C, which are schematic diagrams illustrating how the similarity matrix SMX1 is processed to generate the inlier-outlier predictions PRED according to the demonstrational example. In some embodiments, step S140 further includes three detail steps S141-S143.

As shown in FIG. 5B, the processing unit 240 performs step S141 to select one maximal along each row of the similarity matrix SMX1, to generate another matrix SMX1a. Afterward, the processing unit 240 performs step S142 to multiply the matrix SMX1a with a weighting matrix WMX to generate still another matrix SMX1b. Weighting values in the weighting matrix WMX are determined by whether maximal selected in step S141 corresponds to the assigned inlier image INL or the assigned outlier image OUTL. As shown in the matrix SMX1b, the similarity scores corresponding to the images IMG5 and IMG6 are converted into negative values in step S142.

As shown in FIG. 1, FIG. 2 and FIG. 5C, the processing unit 240 performs step S143 to compare the similarity scores in the matrix SMX1b (corresponding to the images IMG1-IMG6) with a threshold similarity value, so as to predict the inlier-outlier predictions of the images IMG1-IMG6. It is assumed that a default value of the threshold similarity value is set as 0.93.

In this case as shown in FIG. 5C, the image IMG3 has a similarity score "0.94" which exceeds the threshold similarity value "0.93", such that the image IMG3 is predicted as inlier in the inlier-outlier predictions PRED.

In this case as shown in FIG. 5C, the images IMG2, IMG4, IMG5 and IMG6 have corresponding similarity scores "0.92", "0.91", "−1.0" and "−0.86", which are below the threshold similarity value "0.93", such that the image IMG2, IMG4, IMG5 and IMG6 are predicted as outlier in the inlier-outlier predictions PRED.

In aforesaid embodiments shown in FIG. 5A to FIG. 5C, the first similarity scores SSc1 and the second similarity scores SSc2 in the similarity matrix SMX1 are processed into the matrix SMX1b, which is utilized to generate the inlier-outlier predictions PRED.

In some other embodiments, the assigned outlier image OUTL is not necessarily required in generating the inlier-outlier predictions PRED. If the manual-input label only selects the assigned inlier image INL without selecting the assigned outlier image OUTL. In this case, step S140 can be executed, by the processing unit 240, to classify each of the unlabeled images ULIMG by comparing the first similarity scores SSc1 in FIG. 5A of the unlabeled images (e.g., IMG1-IMG6) with the threshold similarity value "0.93", and generate the inlier-outlier predictions PRED based on the first similarity scores SSc1 without considering the second similarity scores SSc2.

Based on aforesaid embodiments, the data classification method 100 shown in FIG. 1 is configured to generate the inlier-outlier predictions PRED of all of the unlabeled images based on a small amount of manual-labeled images (i.e., the assigned inlier image INL and the assigned outlier image OUTL). In other words, the data classification method 100 can save a lot of time and human resource in labeling inliers and outliers within big datasets.

Figure 6:
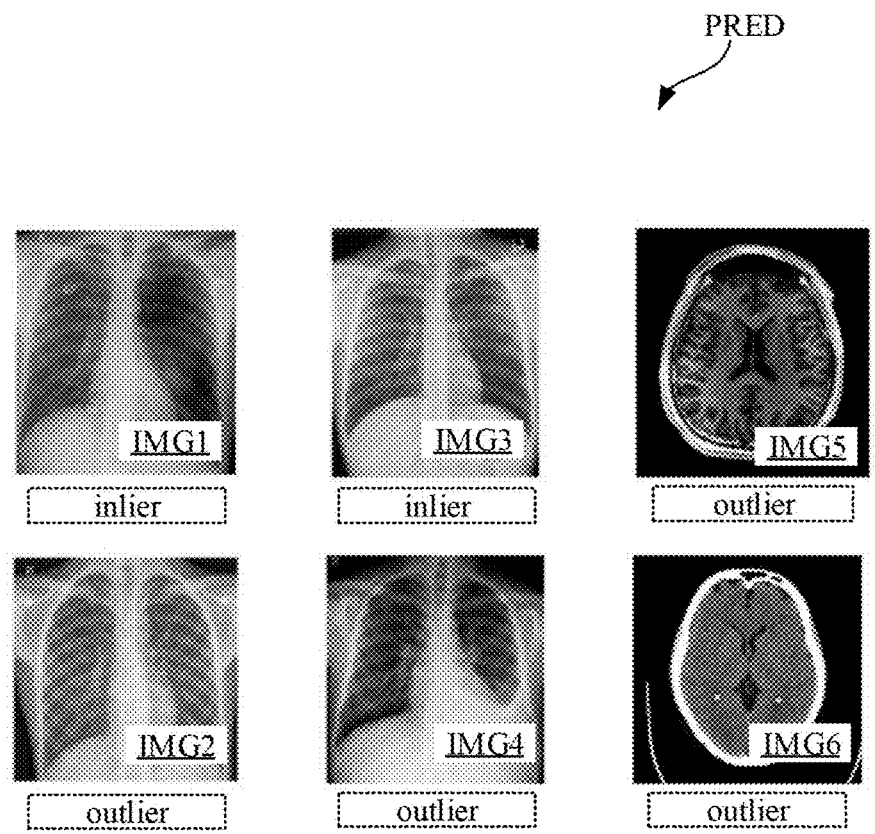
FIG. 6 is a schematic diagram illustrating the inlier-outlier predictions displayed on the displayer according to some embodiments.

As shown in FIG. 1 and FIG. 2, step S150 is executed to display the inlier-outlier predictions PRED on the displayer 280. Reference is further made to FIG. 6, which is a schematic diagram illustrating the inlier-outlier predictions PRED displayed on the displayer 280 according to some embodiments. In this case, the user can review the inlier-outlier predictions PRED of the image IMG1-IMG6. If the inlier-outlier predictions PRED are not ideal to the user, the user can provide a feedback to adjust parameters of the classification.

In some embodiments, when the user reviews the inlier-outlier predictions PRED and learns that the current threshold similarity value is not ideal, step S152 can be executed by the data classification method 100 to collect an adjusted threshold similarity value according to a feedback command inputted through the input interface 220. For example, the threshold similarity value can be adjusted lower into the adjusted threshold similarity value "0.90". As shown in FIG. 1, FIG. 2 and FIG. 5A, step S140 is executed again, by the processing unit 240, to re-classify each of the unlabeled images ULIMG in reference with the adjusted threshold similarity value "0.90". In this case, the image IMG1-IMG4 will be classified as "inlier" in reference with the adjusted threshold similarity value "0.90". In other words, the threshold similarity value can be adjusted to be higher/lower according to the feedback command.

In some other embodiments, when the user reviews the inlier-outlier predictions PRED and learns that the manual-input labels are not ideal, step S154 can be executed by the data classification method 100 to collect adjusted manual-input labels according to a feedback command inputted through the input interface 220. For example, the user can manually assign images IMG1 and IMG4 as "inlier", and delete the "outlier" label from the image IMG5. As shown in FIG. 1, FIG. 2 and FIG. 5A, step S120 is executed again, by the processing unit 240, to re-select the images IMG1 and IMG4 as assigned inlier images INL. Step S130 is executed again to re-compute the similarity matrix (not shown in figures) based on the assigned inlier images INL, which includes the images IMG1 and IMG4 in this case. The similarity matrix will include two columns of similarity scores about the unlabeled images IMG1-IMG6 relative to the assigned inlier images IMG1 and IMG4. One column of similarity scores are about the unlabeled images IMG1-IMG6 relative to the assigned inlier image IMG1. Another column of similarity scores are about the unlabeled images IMG1-IMG6 relative to the assigned inlier image IMG4. Step S140 is executed again to re-classify the unlabeled images IMG1-IMG6 based on the similarity matrix after re-computing. In this case, if an initial set of the manual-input labels are not ideal, the user can correct the manual-input labels in step S154 and re-generate the inlier-outlier predictions PRED accordingly.

Figure 7:
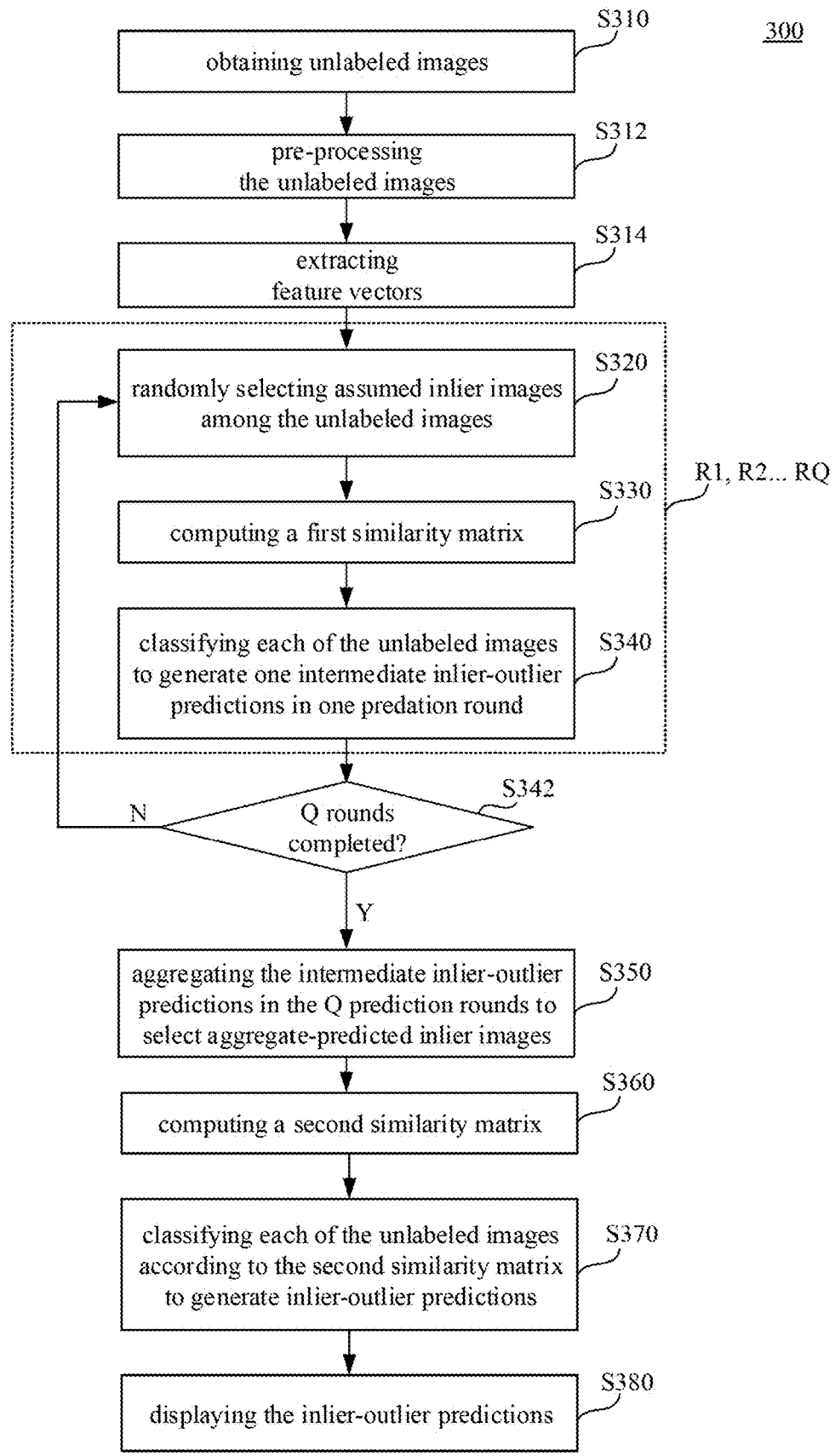
FIG. 7 is a flow chart diagram illustrating another data classification method according to some embodiments of the disclosure.

The data classification method 100 shown in FIG. 1 in aforesaid embodiments relies on the small amount of manual-labeled images to perform the classification. However, the disclosure is not limited thereto. Reference is further made to FIG. 7, which is a flow chart diagram illustrating another data classification method 300 according to some embodiments of the disclosure. The data classification method 300 in FIG. 7 can also be executed by the electronic device 200 shown in FIG. 2. Compared to the data classification method 100 in FIG. 1, the data classification method 300 shown in FIG. 7 is not required to collect any manual-input label from the user.

In some embodiments, as shown in FIG. 2 and FIG. 7, step S310 is executed by the processing unit 240 to obtain the unlabeled images ULIMG (referring to embodiments in FIG. 3). Details of step S310 are similar to step S110 in aforementioned embodiments, and not repeated here. Step S312 is executed, by the processing unit 240, to pre-processing the unlabeled images. During the pre-processing in step S312, the processing unit 240 is configured to perform pixel-value windowing, intensity scaling, size scaling and/or normalization to the unlabeled images ULIMG, so as to convert the unlabeled images ULIMG into the same format, the same size scale and/or the same color scale. Details of step S312 are similar to step S112 in aforementioned embodiments, and not repeated here. Step S314 is executed, by the processing unit 240, to extract feature vectors from the unlabeled images ULIMG. In some embodiments, the processing unit 240 can operate a neural network model (e.g., Contrastive Language-Image Pre-Training (CLIP) neural network or a Residual Network (ResNet)) to extract the feature vectors. Details of step S314 are similar to step S114 in aforementioned embodiments, and not repeated here.

After step S314, the data classification method 300 is configured to executing Q prediction rounds R1, R2 . . . RQ about the unlabeled images ULIMG to generate intermediate inlier-outlier predictions in each of the Q prediction rounds R1, R2 . . . RQ. Q is a positive integer.

During the prediction round R1, step S320 is executed by the processing unit 240 to randomly select assumed inlier images among the unlabeled images ULIMG. The assumed inlier images are randomly sampled from the unlabeled images ULIMG and regarded as "inlier" in this prediction round R1. In practical applications, the unlabeled images ULIMG in the dataset usually include relatively more inlier data and relative fewer outlier data (e.g., a ratio between inlier to outlier can be 5:1 or even 10:1). Therefore, the assumed inlier images randomly sampled from the unlabeled images ULIMG have a higher possibility to select actual inlier data, and have a smaller possibility to select actual outlier data.

Later in the prediction round R1, step S330 is executed by the processing unit 240 to compute a first similarity matrix, which includes first similarity scores of the unlabeled images ULIMG relative to the assumed inlier images. Details of step S330 are similar to step S130 in aforementioned embodiments, and not repeated here. The difference between step S330 in FIG. 7 and step S130 in FIG. 1 is that the assumed inlier images utilized in computing the first similarity matrix are based on the randomly selection in step S320, not based on the manual-input label.

Later in the prediction round R1, step S340 is executed by the processing unit 240 to classify each of the unlabeled image ULIMG based on the first similarity matrix and to generate intermediate inlier-outlier predictions about the unlabeled images in the prediction round R1. Details of step S340 are similar to step S140 in aforementioned embodiments, and not repeated here.

As shown in FIG. 7, step S342 is executed to check whether the Q prediction rounds R1-RQ are finished or not. In this case, because it is not finished yet, the data classification method 300 returns to step S320 and enter another prediction round R2. During the prediction round R2, steps S320-S340 are executed by the processing unit 240 to select another set of assumed inlier images, and generate the intermediate inlier-outlier predictions accordingly. Similarly, the steps S320-S340 will be repeated in following rounds, until the prediction round RQ is executed and finished.

After the Q prediction rounds R1-RQ are finished, the data classification method 300 goes to step S350, which is executed by the processing unit 240 to aggregate the intermediate inlier-outlier predictions in the Q prediction rounds R1-RQ, so as to select aggregate-predicted inlier images. Reference is further made to FIG. 8, which is a schematic diagram illustrating aggregated predictions $PRED_{ALL}$ of all prediction rounds according to some embodiments of the disclosure. As shown in FIG. 8, the aggregated predictions $PRED_{ALL}$ includes intermediate inlier-outlier predictions $PRED_{R1}$ from the prediction round R1, intermediate inlier-outlier predictions $PRED_{R2}$ from the prediction round R2, . . . and intermediate inlier-outlier predictions $PRED_{RQ}$ from the prediction round RQ.

As shown in FIG. 8, each of the images IMG1-IMG6 is classified into "inlier" or "outlier" in each of the prediction rounds R1-RQ. In some embodiments, during step S350, only the unlabeled images classified as inlier in all of the Q prediction rounds are selected as the aggregate-predicted inlier images.

As shown in FIG. 8, because the images IMG1 and IMG3 are classified as "inlier" in all intermediate inlier-outlier predictions $PRED_{R1}$ to $PRED_{RQ}$, the images IMG1 and IMG3 are selected as the aggregate-predicted inlier images INLa.

On the other hand, the image IMG2 is classified as "outlier" in the intermediate inlier-outlier predictions $PRED_{R1}$, such that the image IMG2 is disqualified. Similarly, image IMG4 is classified as "outlier" in the intermediate inlier-outlier predictions PRED R2, such that the image IMG2 is disqualified.

In some embodiments, Q is configured to be a positive integer between about 10 to about 20. If Q is smaller than 10, the aggregate-predicted inlier images can be not accurate enough (e.g., actual outlier images may be mixed into the aggregate-predicted inlier images by chances). If Q is higher than 20, it can be too strict and too difficult in selecting the aggregate-predicted inlier images.

As shown in FIG. 2, FIG. 7 and FIG. 8, step S360 is executed by the processing unit 240 to compute a second similarity matrix, which includes first similarity scores of the unlabeled images ULIMG relative to the aggregate-predicted inlier images INLa. Details of step S360 are similar to step S130 in aforementioned embodiments, and not repeated here. The difference between step S360 in FIG. 7 and step S130 in FIG. 1 is that the aggregate-predicted inlier images INLa utilized in computing the second similarity matrix are based on step S350, not based on the manual-input label.

As shown in FIG. 2 and FIG. 7, step S370 is executed by the processing unit 240 to classify each of the unlabeled images ULIMG based on the second similarity matrix and to generate inlier-outlier predictions about the unlabeled images ULIMG. Details of step S370 are similar to step S140 in aforementioned embodiments, and not repeated here.

In some embodiments, step S380 is executed to display the inlier-outlier predictions (referring to FIG. 6) generated in step S370 to the user.

In embodiments shown in FIG. 7, the data classification method 300 is not required to collect any manual-input label from the user. The data classification method 300 provides an another approach to generate the inlier-outlier predictions of the unlabeled images ULIMG based on random sampling in the prediction rounds R1-RQ, without any manual-input label. The data classification method 300 can be executed automatically without waiting for manual-input labels. In some cases, the data classification method 300 may not be accurate sometimes because the random sampling has possibility to select actual outlier data as assumed inliers.

Figure 9:
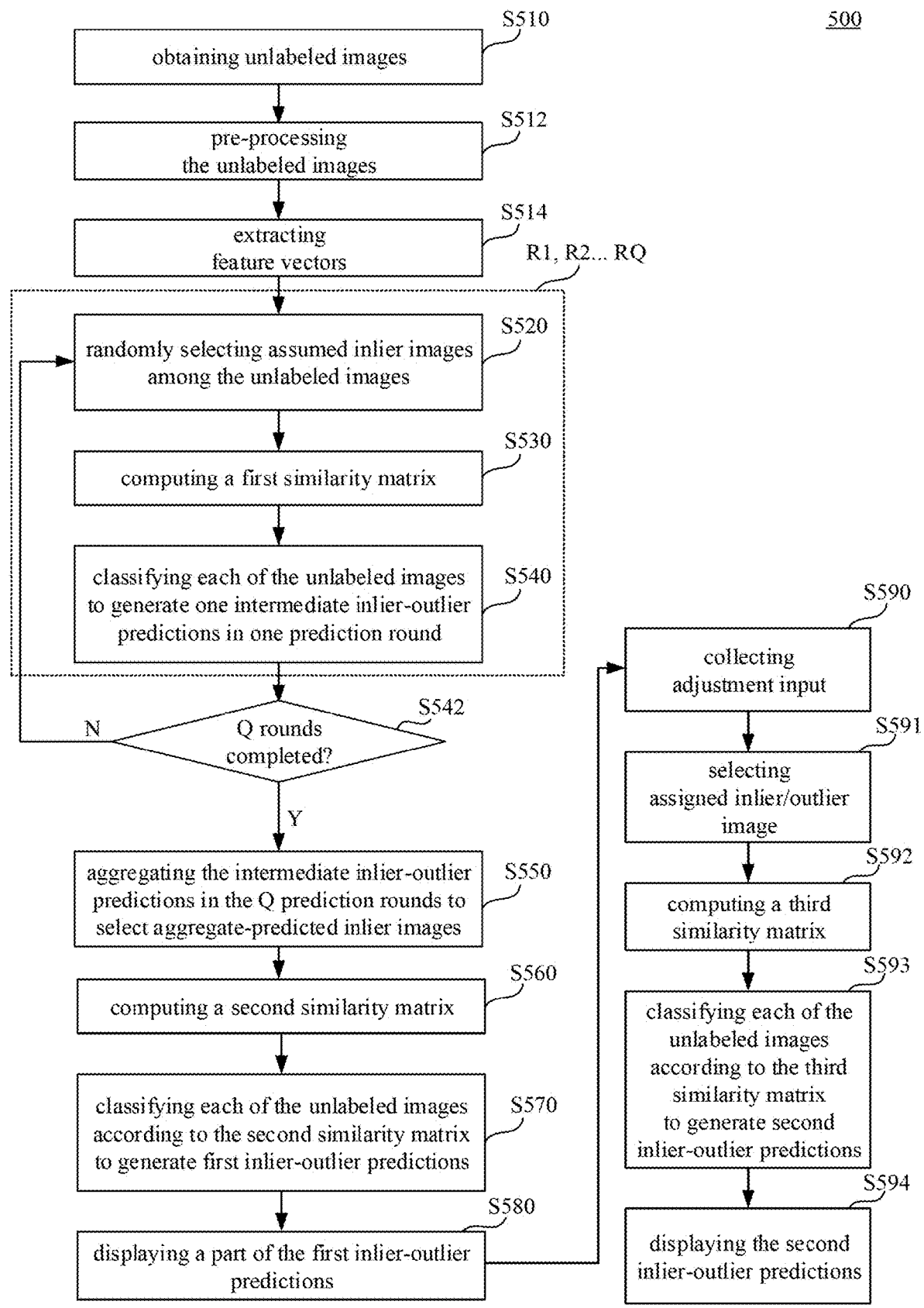
FIG. 9 is a flow chart diagram illustrating a data classification method according to some embodiments of the disclosure.

In some other embodiments, the disclosure provides a hybrid approach based on the data classification method 100 shown in FIG. 1 and the data classification method 300 shown in FIG. 7. Reference is further made to FIG. 9, which is a flow chart illustrating a data classification method 500 according to some embodiments of the disclosure. Steps S510, S512, S514, S520, S530, S540, S542, S550, S560 and S570 of the data classification method 500 in FIG. 9 are similar to steps S310, S312, S314, S320, S330, S340, S342, S350, S360 and S370 of the data classification method 300 in FIG. 7, and not repeated here.

Figure 10:
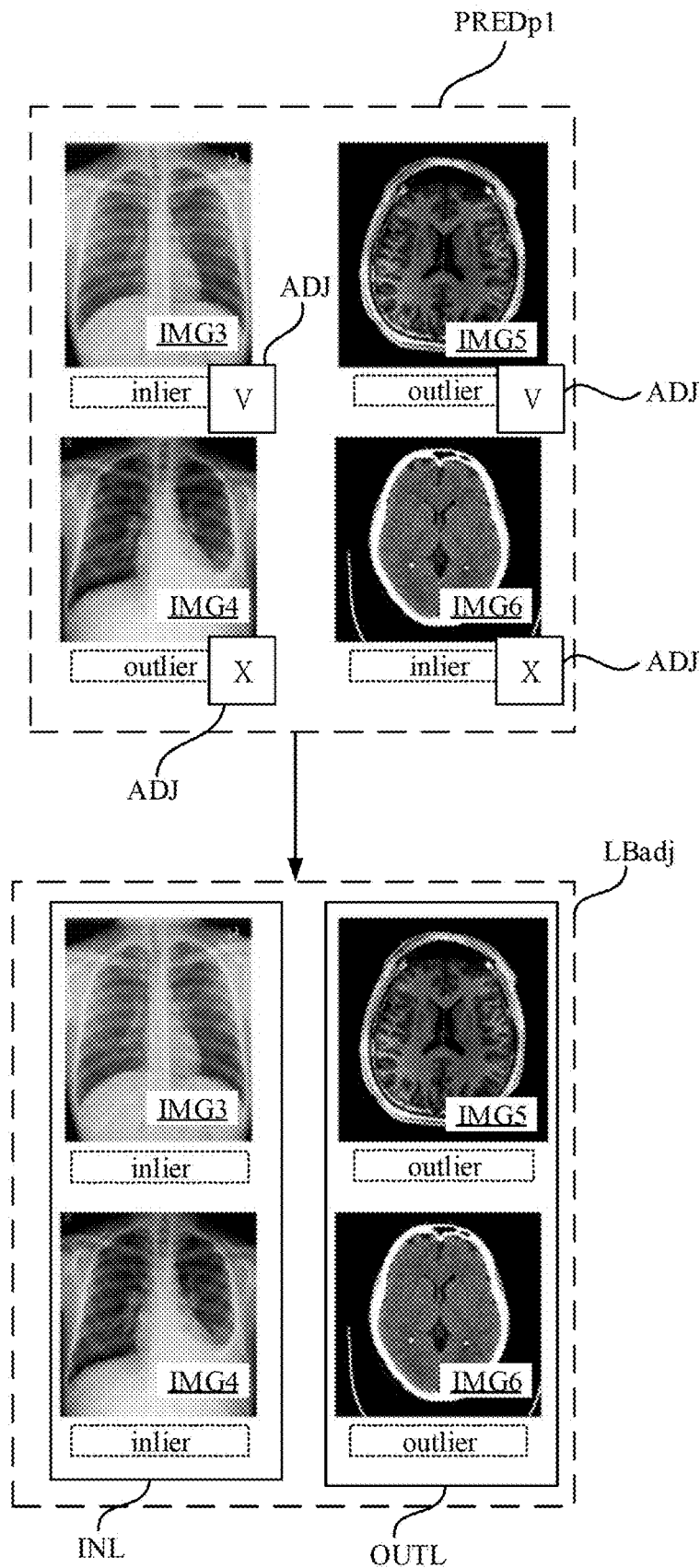
FIG. 10 is a schematic diagram illustrating the partial predictions of the first inlier-outlier predictions displayed on the displayer and an adjustment input according to some embodiments.

As discussed in aforementioned embodiments, the first inlier-outlier predictions of the unlabeled images ULIMG can be generated in step S570. Step S580 is executed to display a part of the first inlier-outlier predictions of the unlabeled images ULIMG. In practical applications, the first inlier-outlier predictions are generated from thousands of unlabeled images ULIMG. Step S580 is configured to display a relatively small amount the first inlier-outlier predictions on the displayer 280. Reference is further made to FIG. 10, which is a schematic diagram illustrating the partial predictions PREDp1 of the first inlier-outlier predictions displayed on the displayer 280 and an adjustment input ADJ according to some embodiments.

In some embodiments, the first inlier-outlier predictions are generated automatically without waiting for manual-input labels. The partial predictions PREDp1 of the first inlier-outlier predictions may include some false predictions. The user can review on the partial predictions PREDp1 of the first inlier-outlier predictions, and provide an adjustment input ADJ corresponding to the partial predictions PREDp1. In the embodiments shown in FIG. 10, the adjustment input ADJ indicates the partial predictions PREDp1 about the images IMG4 and IMG6 are not correct, and the partial predictions PREDp1 about the images IMG3 and IMG5 are correct.

As shown in FIG. 2 and FIG. 10, step S590 is executed to collect the adjustment input ADJ through the input interface 220. Based on the adjustment input ADJ, adjusted manual-input labels LBadj corresponding to the images IMG3-IMG6 are formed as shown in FIG. 10.

In response to the adjustment input ADJ (and the adjusted manual-input labels LBadj), step S591 is executed, by the processing unit 240, to select the images IMG3 and IMG4 among the unlabeled images ULIMG as assigned inlier images INL based on the adjustment input ADJ, and also select the images IMG5 and IMG6 among the unlabeled images ULIMG as assigned outlier images OUTL based on the adjustment input ADJ.

As shown in FIG. 2 and FIG. 9, step S592 is executed by the processing unit 240 to compute a third similarity matrix, which includes third similarity scores of the unlabeled images ULIMG relative to the assigned inlier images INL and the assigned outlier images OUTL based on the adjustment input ADJ. Details of step S592 in FIG. 9 are similar to step S130 in FIG. 1 discussed in aforementioned embodiments, and are not repeated here.

As shown in FIG. 2 and FIG. 9, step S593 is executed by the processing unit 240 to classify each of the unlabeled images ULIMG into the inlier data set or the outlier data set according to the third similarity matrix, so as to generate second inlier-outlier predictions of the unlabeled images ULIMG. Details of step S593 in FIG. 9 are similar to step S140 in FIG. 1 discussed in aforementioned embodiments, and are not repeated here.

As shown in FIG. 2 and FIG. 9, step S594 is executed to display the second inlier-outlier predictions on the displayer 280.

In some embodiments, the user can review the second inlier-outlier predictions on the displayer 280. If the second inlier-outlier predictions are not correct, the user can provide another adjustment input again and the data classification method 500 can repeat steps S590 to S594 again.

The data classification method 500 in FIG. 9 is the hybrid approach based on the data classification method 100 shown in FIG. 1 and the data classification method 300 shown in FIG. 7. The data classification method 500 can achieve advantages including time-efficiency and accuracy in classifying the unlabeled images ULIMG into the inlier data set or the outlier data set.

In some embodiments, the inlier data set is utilized as training data for training a machine-learning model. The outlier data set is filtered out and not utilized as the training data. In this case, the outlier data set will not affect the training process of the machine-learning model. In this case, it can avoid issues like model bias, increased model complexity, overfitting, reduced robustness, and difficulty in anomaly detection during the training process of the machine-learning model.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A data classification method, comprising:
obtaining unlabeled images;
executing Q prediction rounds about the unlabeled images, Q is a positive integer, each of the Q prediction rounds comprising:
 randomly selecting assumed inlier images among the unlabeled images;
 computing a first similarity matrix comprising first similarity scores of the unlabeled images relative to the assumed inlier images; and
 generating intermediate inlier-outlier predictions about the unlabeled images in one prediction round according to the first similarity matrix;
aggregating the intermediate inlier-outlier predictions about the unlabeled images generated respectively in the Q prediction rounds, to select aggregate-predicted inlier images among the unlabeled images;
computing a second similarity matrix comprising second similarity scores of the unlabeled images relative to the aggregate-predicted inlier images; and
classifying each of the unlabeled images into an inlier data set or an outlier data set according to the second similarity matrix, so as to generate inlier-outlier predictions of the unlabeled images.

2. The data classification method of claim 1, wherein the intermediate inlier-outlier predictions about the unlabeled images are aggregated by:
selecting a part of the unlabeled images classified as inlier in all of the Q prediction rounds as the aggregate-predicted inlier images.

3. The data classification method of claim 1, wherein the first similarity scores are computed by:
performing a similarity algorithm between feature vectors extracted from the unlabeled images and the assumed inlier images, so as to compute the first similarity scores.

4. The data classification method of claim 3, wherein the similarity algorithm is a cosine similarity algorithm, a Euclidean distance similarity algorithm, a Manhattan distance algorithm or a Hamming distance algorithm.

5. The data classification method of claim 1, wherein the intermediate inlier-outlier predictions are generated by:
comparing the first similarity scores of the unlabeled images with a threshold similarity value;
in response to one unlabeled image having one first similarity score exceeding the threshold similarity value, predicting the one unlabeled image as inlier in the intermediate inlier-outlier predictions; and
in response to another unlabeled image having another first similarity score below the threshold similarity value, predicting the another unlabeled image as outlier in the intermediate inlier-outlier predictions.

6. The data classification method of claim 1, wherein the inlier data set is utilized as training data for training a machine-learning model, the outlier data set is not utilized as the training data.

7. The data classification method of claim 1, wherein Q is in a range between about 10 to about 20.

8. A data classification method, comprising:
obtaining unlabeled images, wherein the unlabeled images comprise a plurality of types of medical examination images;

selecting an assigned inlier image among the unlabeled images, wherein the assigned inlier image is one of the types of the medical examination images;
computing a similarity matrix comprising first similarity scores of the unlabeled images relative to the assigned inlier image; and
classifying each of the unlabeled images into an inlier data set or an outlier data set according to the similarity matrix, so as to generate inlier-outlier predictions of the unlabeled images, wherein the inlier data set is configured to train a machine learning model.

9. The data classification method of claim 8, further comprising:
selecting an assigned outlier image among the unlabeled images,
wherein the assigned outlier image is another one of the types of the medical examination images,
wherein the similarity matrix further comprises second similarity scores of the unlabeled images relative to the assigned outlier image, and each of the unlabeled images is classified according to the first similarity scores and the second similarity scores in the similarity matrix.

10. The data classification method of claim 8, wherein the first similarity scores are computed by:
performing a similarity algorithm between feature vectors extracted from the unlabeled images and the assigned inlier image, so as to compute the first similarity scores.

11. The data classification method of claim 10, wherein the similarity algorithm is a cosine similarity algorithm, a Euclidean distance similarity algorithm, a Manhattan distance algorithm or a Hamming distance algorithm.

12. The data classification method of claim 8, wherein the unlabeled images are classified by:
comparing the first similarity scores of the unlabeled images with a threshold similarity value;
in response to one unlabeled image having one first similarity score over the threshold similarity value, classifying the one unlabeled image into the inlier data set; and
in response to another unlabeled image having another first similarity score below the threshold similarity value, classifying the another unlabeled image into the outlier data set.

13. The data classification method of claim 12, further comprising:
displaying the inlier-outlier predictions of the unlabeled images;
collecting an adjusted threshold similarity value; and
re-classifying each of the unlabeled images based on the adjusted threshold similarity value.

14. The data classification method of claim 8, further comprising:
displaying the inlier-outlier predictions of the unlabeled images;
collecting adjusted manual-input labels; and
re-computing the similarity matrix based on the adjusted manual-input labels.

15. The data classification method of claim 8, wherein the inlier data set is utilized as training data for training a machine-learning model, the outlier data set is not utilized as the training data.

16. A data classification method, comprising:
obtaining unlabeled images;
executing Q prediction rounds about the unlabeled images, Q is a positive integer, each of the Q prediction rounds comprising:
randomly selecting assumed inlier images among the unlabeled images;
computing a first similarity matrix comprising first similarity scores of the unlabeled images relative to the assumed inlier images; and
generating intermediate inlier-outlier predictions about the unlabeled images in one prediction round according to the first similarity scores;
aggregating the intermediate inlier-outlier predictions about the unlabeled images generated respectively in the Q prediction rounds, to select aggregate-predicted inlier images among the unlabeled images;
computing a second similarity matrix comprising second similarity scores of the unlabeled images relative to the aggregate-predicted inlier images; and
classifying each of the unlabeled images into an inlier data set or an outlier data set according to the second similarity scores, so as to generate first inlier-outlier predictions of the unlabeled images;
displaying a part of the first inlier-outlier predictions of the unlabeled images;
obtaining an adjustment input revised from the first inlier-outlier predictions;
computing a third similarity matrix comprising third similarity scores of the unlabeled images relative to the adjustment input; and
classifying each of the unlabeled images into the inlier data set or the outlier data set according to the third similarity matrix, so as to generate second inlier-outlier predictions of the unlabeled images.

17. The data classification method of claim 16, wherein the intermediate inlier-outlier predictions about the unlabeled images are aggregated by:
selecting a part of the unlabeled images classified as inlier in all of the Q prediction rounds as the aggregate-predicted inlier images.

18. The data classification method of claim 16, wherein the first similarity scores are computed by:
performing a similarity algorithm between feature vectors extracted from the unlabeled images and the assumed inlier images, so as to compute the first similarity scores.

19. The data classification method of claim 18, wherein the similarity algorithm is a cosine similarity algorithm, a Euclidean distance similarity algorithm, a Manhattan distance algorithm or a Hamming distance algorithm.

20. The data classification method of claim 16, wherein the intermediate inlier-outlier predictions are generated by:
comparing the first similarity scores of the unlabeled images with a threshold similarity value;
in response to one unlabeled image having one first similarity score exceeding the threshold similarity value, predicting the one unlabeled image as inlier in the intermediate inlier-outlier predictions; and
in response to another unlabeled image having another first similarity score below the threshold similarity value, predicting the another unlabeled image as outlier in the intermediate inlier-outlier predictions.

\* \* \* \* \*